Dec. 6, 1960 T. L. TAYLOR ET AL 2,963,652
METHOD AND APPARATUS FOR SELECTIVE PROGRAMED
AUTOMATIC MAINTENANCE OF EQUIPMENT
Filed April 15, 1957 2 Sheets-Sheet 1

INVENTOR.
Jack T. Fischbach
Frederick A. Kahl
Thomas L. Taylor
BY
Stevens, Davis, Miller + Mosher
ATTORNEYS Dec. 6, 1960 T. L. TAYLOR ET AL 2,963,652
METHOD AND APPARATUS FOR SELECTIVE PROGRAMED
AUTOMATIC MAINTENANCE OF EQUIPMENT
Filed April 15, 1957 2 Sheets-Sheet 2

INVENTOR.
Jack T. Fischbach
Frederick A. Kahl
Thomas L. Taylor
BY
Stevens Davis Miller + Mosher
attorneys

# United States Patent Office 2,963,652
Patented Dec. 6, 1960

2,963,652

METHOD AND APPARATUS FOR SELECTIVE PROGRAMED AUTOMATIC MAINTENANCE OF EQUIPMENT

Thomas L. Taylor, Ruxton, Jack T. Fischbach, Baltimore, and Frederick A. Kahl, Owings Mills, Md., assignors to Taylor Engineering, Inc., Baltimore, Md., a corporation of Maryland Filed Apr. 15, 1957, Ser. No. 652,844

5 Claims. (Cl. 324—158)

This invention relates to method and apparatus for selective, programmed, automatic, maintenance for a variety of types of electrical and/or mechanical devices. By this invention, complete systems and/or their components can be rapidly checked out during manufacturing inspection, in plant operation, and after erection of equipment and during periods between operations, or, in the case of systems carried by aircraft or missiles, a final check out can be made just prior to take-off or launching.

It has been the practice to date, to have highly trained technicians stand by for last minute check outs at missile sites for the purpose of checking out significant controls and guidance systems at the assembly sites of missiles, or in routine maintenance, to ensure continuous readiness for emergency operation. By means of this invention, it is possible to train non-technical personnel in a very short time to check out a complete weapons system and pin-point faults for the specialists to repair.

It is an object of this invention to provide method and apparatus for the selective programed automatic maintenance of electrical and/or mechanical systems and components.

It is another object of this invention to pre-plan and pre-program operational, maintenance and test information of all kinds, and store it in a comparison medium, whereby it can be subsequently matched or compared with signals from any system or component under test.

It is another object of this invention to pre-plan and pre-program operational, maintenance and test information and store it on a transparent film.

It is another object of this invention to pre-plan and pre-program operational, maintenance and test information and to store it on film, and through a selector mechanism select, match and compare the stored information with visual indications given by the test device used for dynamic or static performance measurements and evaluation of signals derived from any source. In a static test, a suitable signal voltage is obtained from the signal generator and impressed upon the circuit under test, while in a dynamic test the circuit selected for test is energized by its own power source.

It is another object of this invention to pre-plan and pre-program test criteria in a system, circuit by circuit, including components, and display a response to suitable impressed voltages on such circuits or components for comparison with standard performance data.

Further and other objects will become apparent from the following specification in which like numerals refer to like parts.

As has been pointed out above, a missile is assembled and its components tested at a factory, but most missiles are forwarded to storage or missile launching sites, knocked-down, and then reassembled for operations at some later time. The missile may be erected and checked out at a missile site. However, it will not be fired for days or even months. It is important, as an element of maintenance, to be able to check out control circuits and components in a routine manner during the storage period to ensure readiness for emergency operation. Aircraft, for example, involve a considerable number of electronic, electrical and mechanical devices which are installed in the factory or at bases subsequent to the delivery of the airplane, and it is important to be able to check out circuits and circuit components quickly and easily without removal of equipment from installations. Carrier-based fighter aircraft may require a last minute check out of radio, radar or other electronic equipment prior to takeoff. There are innumerable examples of military and commercial equipment that deteriorates or becomes inoperative in the interim between manufacture and use. To date, it has been the practice to either risk having the equipment maintain its operational characteristics and calibration, or in vital operations, it is important to have a crew of highly trained technicians and skilled maintenance men stand by for last minute check outs of the nature described above.

With the wide field of use of such equipment and the shortage of trained technical personnel, it has become very important to simplify the maintenance and testing of electrical and mechanical equipment, devices and, in particular, systems, in more or less routine fashion, accomplished by relatively unskilled labor.

Figure 1:
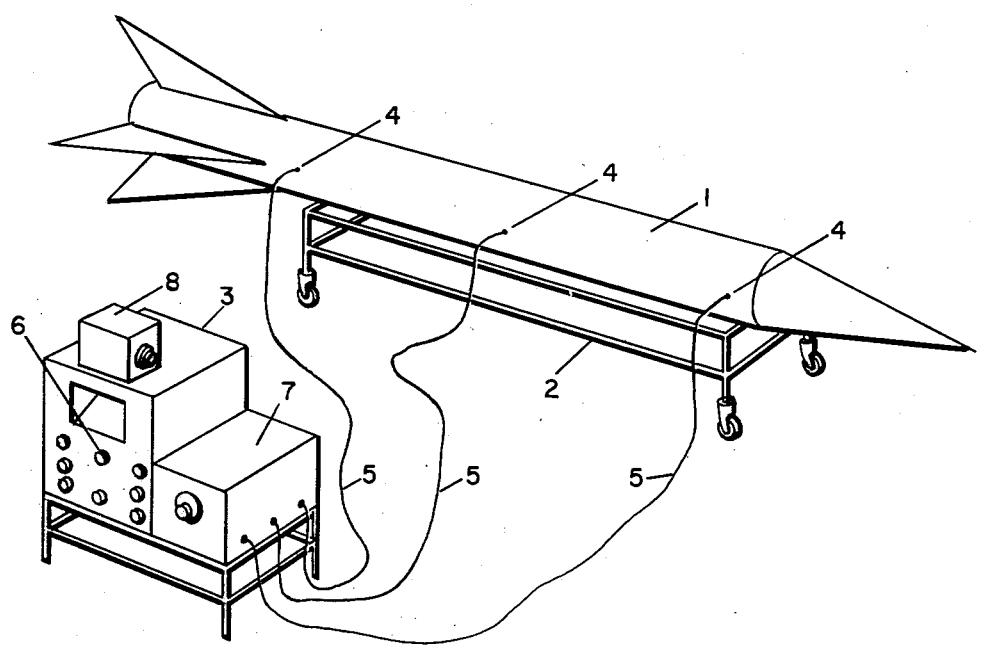
Fig. 1 shows, by way of example, a missile completely assembled and ready for test.

By way of example and without any limitation of the scope of application of this invention, Fig. 1 shows a missile 1 completely assembled, with all its operating components installed. It is mounted on a handling dolly 2. The test equipment for carrying out the invention is shown at 3. Electrical plug connects 4 are built into the missile assembly for ease of access to the equipment or suitable provision is made for access to the components of the system for test. Electrical cables 5 interconnect test equipment 3 with the equipment in the missile at plugs 4. Plugs 4 and cables 5 are of a multi-wire type, capable of carrying sufficient suitable signal voltages from the test equipment to be impressed on a sequence of circuits or components under test, and transmit a signal from such circuit or component back through the equipment to a display device 6. It should be here pointed out that it is possible to analyze electrical and/or mechanical devices or electronic circuitry, by the analysis of circuits or components for each piece of equipment. From an electrical circuit or an electrical component, a signal response can be ascertained to give an indication of readiness for satisfactory performance. For other components or mechanical devices, transducers may be employed. For example, fluid systems may have inserted therein transducers which will generate a significant electrical signal, indicating a proper performance of that particular fluid circuit element or component or a fluid line may be connected between the fluid circuit under test and a transducer in the test equipment 3.

Figure 2:
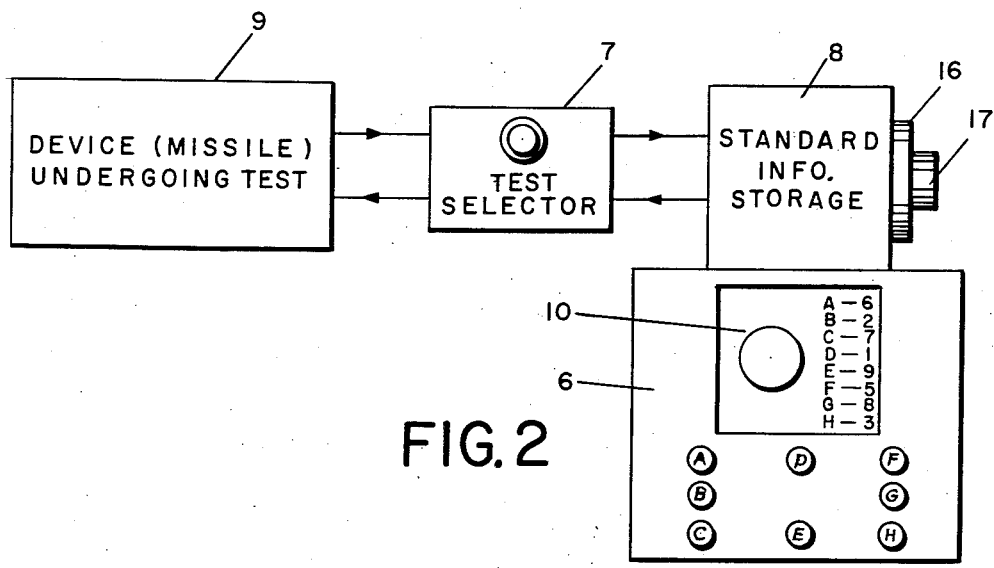
Fig. 2 is a schematic arrangement of equipment for carrying out the method of this invention.

The test equipment shown at 3 in Fig. 1, consists, broadly, of a signal generator and display device 6, a test selector 7 and a standard information storage device 8. These components are shown in Fig. 2, wherein element 9 is any device undergoing test, such as the missile 1 of Fig. 1. Test selector 7 is connected between the signal generator and display device 6 and a device 9 undergoing test. Test selector switch 7 can select in sequence, a series of critical circuits and/or components from the device undergoing test. The test selector 7 will select one circuit, for example, of device 9. The signal generator will generate and impress upon that circuit a suitable signal voltage. The response of the circuit will be transmitted to the display device 10.

Figure 3:
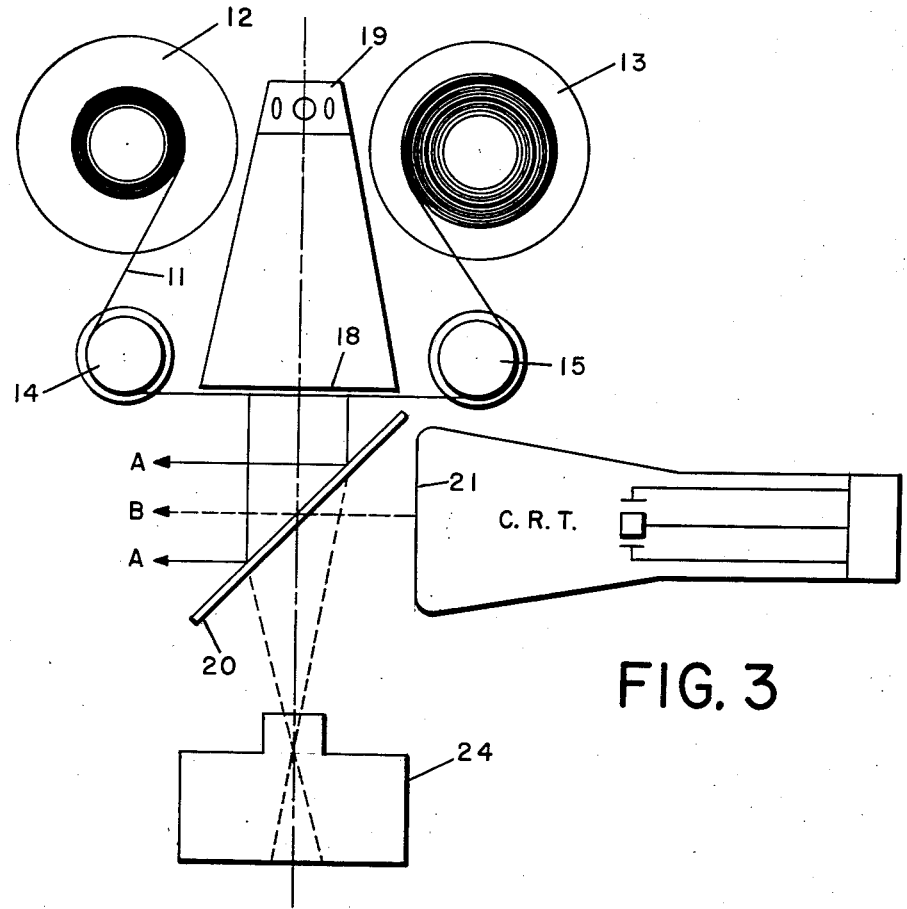
Fig. 3 shows a standard test information storage magazine associated with a test data signal display device.

Device 8 is any device wherein standard information indicating the satisfactory performance of the circuit element or component is stored. It may be stored in any manner (for example any memory device or storage device such as used in the storage of information in electronic computers) as long as it can be removed from the storage and compared in some manner (visually or in a network) with the response to the circuit undergoing test. For purposes of this explanation, a standard test information storage device is shown in Fig. 3, wherein the proper, with permissive variation, performance characteristic of a selected circuit is printed on a strip of film 11. Film strip 11 can be moved between reels 12 and 13 over positioning rollers 14 and 15. A section of the film strip carrying the characteristic response of the circuit under test is selected from indicator 16 or from indicia carried on film strip 11 and moved into position by member 17 so that it registers on a screen 18. It is illuminated by a light 19. A half-silvered-mirror 20 is placed at a 45° angle with the axis of a normal, through the light box and section of the film strip in registration with screen 18 (or any suitable combination of angles so that there is no distortion of the related images in relationship one to the other). The image of the standard circuit response will be reflected by the arrows A for visual observation. At the same time, the circuit under test transmits a signal to the display device which registers a typical response signal on the screen 21 of a cathode ray tube. The image on the screen of the cathode ray tube can be viewed as B through half-silvered mirror 20. The resultant composite visual display may be in accordance with the example shown in Fig. 4. The reflected image of the proper response from the standard information storage film is shown by curve A. The trace shown in dotted lines indicated as B is the image that actually appears on screen 21 of the cathode ray tube, showing the characteristic response of the selected circuit under test. To achieve the coincidence of the images for purposes of comparison, film strip 11 carries along its lefthand side at 22 a code showing dial settings for dials A to G for the display device. When the image for the film strip is projected as shown in Fig. 3, the dials on the front of the display device are set to the positions shown on code 22. This ensures the proper amplitude and spread of image B, so that a proper comparison of the standard signal and the response signal may be had and the permissible limitations of variation obtained. With a limited amount of experience, the operator could determine that response signal B is close enough to standard reference A so that the system could be given a passing grade insofar as that particular circuit is concerned. A camera 24 can be located to photograph the images appearing on member 20 from either side. It is shown in Fig. 3, photographing the under side. In this way a record can be made for recurring faults for purposes of further analysis of the circuit or system.

Figure 4:
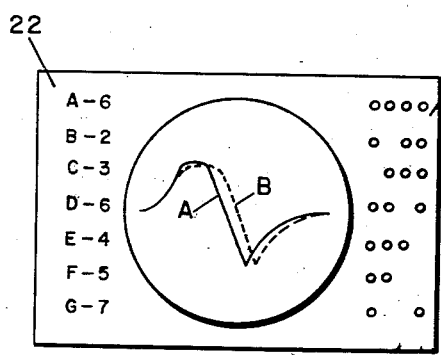
Figs. 4 and 5 show typical displays of a comparison of a standard and test signal.
Figure 5:
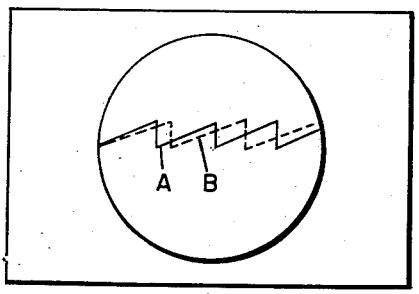

Fig. 5 is similar to Fig. 4 and it shows a standard sawtooth signal generator. It shows a waveform A and superposed on it is the response sawtoothed signal B. If this were to be used as a timing signal, it is obvious that the circuit is in error and would not be passed in a maintenance check. Trace A may be shown as a double line or a shaded trace to show the permissible limitations of variation of the response signal, so that a quick visual inspection and without any experience or training, a decision can be made from the matching of the two images A and B, whether or not to accept or reject the system under test. The standard reference trace A serves, in effect, as a "go" or a "no-go" gauge.

The foregoing description of an example of the embodiment of the test method and equipment for carrying it out should be construed as only an example of one application. It is to be understood that to avoid the manual operations involved in setting dials A to G in accordance with the code appearing with each typical test standard or particular circuit, the dial settings A to G may be coded with suitable indicia shown at 23, which may be opaque or transparent spots on a film or perforations in the film, which actuate suitable pick-up means to set proper circuit values in the display device, for automatically bringing to proper configuration the response signal to the circuit under test to coincide with the standard test pattern. In addition, the test selector can be programed in accordance with the sequence on film strip 11 so that a succession of circuits can be selected, displayed, visually compared and accepted or rejected in a relatively short period of time.

It is to be understood that while we have described the preferred embodiment of our invention in this specification, certain changes, alterations, modifications and substitutions may be made by those skilled in the art without departing from the scope of the appended claims.

We claim:

1. In an operational and maintenance testing device for checking circuits and electrical circuit components, a cathode ray tube display device for testing a circuit, a transparent reflecting member inclined at an angle of 45° to the face of said cathode ray tube display device, a film strip magazine mounted about an axis inclined at an angle of 45° to said reflecting member, said film strip magazine positioning a film strip carried thereby transversely of said axis, whereby the superimposed images from said film strip of predetermined standard circuit response and said cathode ray tube test circuit displayed response may be viewed from either side of said reflecting member.

2. Testing apparatus for testing circuits of electrical and electro-mechanical devices, comprising means to supply a suitable voltage to a circuit to be tested, means to receive and display the response signal to said voltage from said circuit under test, means to superimpose an independent standard response pattern predetermined from a separate identical standard circuit with said circuit under test on said displayed response to show any deviation of said test circuit response from said standard circuit response.

3. A method of testing an electrical system comprising the steps of selecting individual circuits in predetermined succession, impressing on the selected circuits a suitable voltage, receiving and displaying a signal response form each circuit under test on an instrument, superimposing a standard response signal from a predetermined succession of prepared standard response signals on a film strip on said test signal response to display any deviation of the test signal response from the standard signal response.

4. Test apparatus for testing circuits of electrical and electromechanical devices, comprising means to supply a suitable voltage to a circuit to be tested, oscilloscope means to receive and display the rensponse signal to said voltage from said circuit under test, means to superimpose an independent standard response pattern predetermined from a separate identical standard circuit with said circuit under test on said displayed response, said means to superimpose said standard response on said test response comprising a transparent reflecting member positioned in front of said oscilloscope means and inclined at an angle of forty-five degrees to the screen of said oscilloscope means, means to mount a film strip carrying a predetermined standard acceptable response indicia thereon, said mounting means positioning said strip transversely to an axis inclined forty-five degrees to the other side of said reflecting member, said inclined axes lying in a plane perpendicular to said reflecting member, whereby the images from said film strip of predetermined standard responses and said test circuit responses displayed on said oscilloscope may be compared.

5. Test apparatus for testing electrical circuits of electromechanical devices in predetermined succession comprising test selector switch means interconnecting circuits of said devices and said testing apparatus, means to supply a suitable voltage to circuits of said devices to be tested in succession through said selector switch means, oscilloscope means to receive and display the response signal from each said circuits under test, a film comparator comprising a strip of film having standard signal responses imprinted thereon and means to superimpose the image of each said standard signal response on said displayed test signal response of each circuit under test in succession.

References Cited in the file of this patent

UNITED STATES PATENTS

| | | |
|---|---|---|
| 1,899,032 | Handschiegl | Feb. 28, 1933 |
| 2,301,826 | Steodel et al. | Nov. 10, 1942 |
| 2,460,350 | Hinman | Feb. 1, 1949 |
| 2,602,839 | Ellis | July 8, 1952 |
| 2,648,979 | Cornett | Aug. 18, 1953 |
| 2,780,132 | Dickson | Feb. 5, 1957 |